United States Patent [19]

Vadekar et al.

[11] 4,008,160

[45] Feb. 15, 1977

[54] PROCESS FOR REMOVING OIL FROM OILY WASTE WATER STREAMS

[75] Inventors: Mohan Vadekar; Herbert S. Wilson, both of Sarnia, Canada

[73] Assignee: Exxon Research and Engineering Company, Linden, N.J.

[22] Filed: July 30, 1975

[21] Appl. No.: 600,460

[52] U.S. Cl. .................. 210/23 R; 210/DIG. 5; 210/DIG. 26

[51] Int. Cl.² ........................ B01D 13/00

[58] Field of Search ........... 210/DIG. 21, 40, 23 R, 210/242 AS, DIG. 5, DIG. 26 P

[56] References Cited

UNITED STATES PATENTS

| | | | |
|---|---|---|---|
| 3,494,862 | 2/1970 | Horowitz | 210/40 |
| 3,518,183 | 6/1970 | Evans | 210/40 |
| 3,674,683 | 7/1972 | Rainer | 210/DIG. 21 X |
| 3,948,768 | 4/1976 | Chapman | 210/23 R |

FOREIGN PATENTS OR APPLICATIONS

| | | | |
|---|---|---|---|
| 112,437 | 12/1969 | Denmark | 210/DIG. 21 |

Primary Examiner—Frank A. Spear, Jr.
Assistant Examiner—Ethel R. Cross
Attorney, Agent, or Firm—Edward M. Corcoran

[57] ABSTRACT

A process for removing oil from oily waste water streams, particularly from aqueous refinery streams wherein the oil is present as a stable oil-in-water emulsion, which comprises passing the stream over a particulate bed of an unprocessed, vinyl chloride containing polymer including PVC and its copolymers.

9 Claims, No Drawings

PROCESS FOR REMOVING OIL FROM OILY WASTE WATER STREAMS

BACKGROUND OF THE INVENTION

1. Field of the Invention

This invention relates to a process for removing oils from oily waste water streams. More particularly, this invention relates to a process for removing oil from aqueous refinery streams wherein the oil is present in the stream as free oil and as an oil-in-water emulsion, the oil being removed from the water by passing the stream over a particulate bed of vinyl chloride containing polymers such as PVC and its copolymers. Still more particularly, this invention relates to the removal of oil from oily refinery streams wherein the oil is present as a relatively stable oil-in-water emulsion and wherein said streams may be sour water from a steam cracker or spent caustic from steam cracker treating towers and wherein the stream is filtered through a bed of unprocessed, powdered PVC homopolymer or its copolymers such as PVC, Saran (a vinyl chloride-vinylidene chloride copolymer) and polyvinyl chloride-polyvinyl acetate.

2. Description of the Prior Art

Increasing world population and concomitant expansion of industrial output has placed continuously increasing demands on industry to curtail environmental pollution and, at the same time, to make more efficient use of natural resources. One of the most meaningful and relevant goals of any industry is to decrease and even eliminate environmental pollution while at the same time reduce consumption of natural resources by using waste products of one industry as the raw materials for other industries, thereby effectively recycling material and industrial resources.

Aggressive industrialization has resulted in particularly acute demands for oil and oil-derived products, particularly petroleum oil and its products, such as gasoline, fuel oils, chemicals, plastics, etc. Pollution of the surface of the sea due to spillage from tankers and leakage from offshore drilling facilities has received much attention in recent years because of the immediately visible destruction of the natural environment including beaches, fish, local wild life, etc. Another, but less publicized area of environmental pollution from oily wastes derives from the aqueous effluent of oil refineries, chemical plants, cleaning operations, etc. This can be particularly difficult to deal with as opposed to oily spills on sea water, because these oils are often present as a relatively stable oil-in-water emulsion. Such emulsions are fairly stable and are consequently difficult to break and separate from the water in an economical, efficient manner.

Free oil, as well as oil that is in suspension or as a relatively unstable oil-in-water emulsion, can readily be separated from the oil-contaminated water by various physical or mechanical processes, such as screen-type filters or coalescers followed by some sort of settling tank wherein the oil rises to the surface and can be skimmed off using ribbon skimmers, etc. However, these methods do not work with relatively stable oil-in-water emulsions. In order to break or demulsify a more stable emulsion, one must resort to chemical separation means such as adding ionic salts or a water-insoluble solvent for the oil, such as ethers. This will break the emulsion. In either case, however, the cure can be more environmentally detrimental than the disease, as well as rendering the recovered water unsuitable for further use by industry without having to resort to additional purification steps in order to remove the additives added to same in order to break the emulsion.

One of the major sources of oily water in the petroleum industry comes from the sour water effluent of steam cracker primary fractionator tower overheads, which contain highly olefinic, emulsified and free oil, as well as spent caustic from steam cracked liquid and vapor treating towers containing relatively stable but highly reactive, olefinic, polymerizable oil.

Thus, there is a recognized need in the industry for a relatively efficient and economic method of breaking these relatively stable oil-in-water emulsions and to separate the oil therefrom so that the waste waters can either be recycled to other refinery areas or industries, or fed to sewers in a relatively oil free form to avoid environmental pollution.

SUMMARY OF THE INVENTION

A process has now been found for removing, from oily water, both free oil and oil that exists as a relatively stable oil-in-water emulsion and wherein said oil may also be a relatively reactive, olefinic species, which comprises passing said oily water over or through a bed comprising unprocessed, granular vinyl chloride containing polymeric compounds, which compounds are composed of at least 50% of vinyl chloride on a mole basis, or its equivalent in carbon-to-chlorine bonds.

The free oil may be saturated or unsaturated. If it is saturated, then it is removed from the water primarily by physical adsorption onto the surface of the polymer. The emulsified oil preferably comprises a relatively olefinic, reactive, polymerizable species. This species is actually absorbed by and at least partially plasticizes the vinyl chloride containing polymeric media. Illustrative, but nonlimiting examples of oily water streams suitable for use in the instant invention comprise sour water from steam cracker primary fractionator tower overheads and spent caustic from steam cracked liquid and vapor treating towers, both of which contain appreciable amounts of highly olefinic, polymerizable oil in the form of a relatively tight or stable oil-in-water emulsion. Spent caustic streams from the treating of hydrocarbon gases and liquids from steam crackers usually contain from about 300 to about 10,000 or more ppm of highly reactive, polymerizable, unsaturated olefinic and (often conjugated) diolefinic, sulfur containing oily components. These oils are relatively polar and, therefore, remain in emulsion in the aqueous phase. Sour water from steam crackers contains similar oils. Upon standing for extended periods of time, these oils slowly polymerize to higher molecular weight products.

As heretofore described supra, the bed of polymeric filtration media must comprise unprocessed particles of a vinyl chloride containing compound or compounds. That is, the polymer or polymers must contain carbon-chlorine bonds in an amount equivalent to that which would exist if the polymer were polymerized from monomers comprising at least 50 mole percent vinyl chloride monomer. By the word unprocessed, it is meant that the compound or resin must not be processed chemically, thermally or with solvents after being polymerized, because it has been found that further processing, such as pelletizing, casting or plasticizing of the raw, unplasticized vinyl chloride containing compounds, greatly reduces their effectiveness as filtration media useful in the process of the instant invention. The vinyl chloride containing polymer particles may comprise homopolymeric polyvinyl chloride or they may be copolymers of vinyl chloride with a second vinyl-type monomer or mixtures of polyvinyl chloride homopolymers and/or copolymers. For example, they may comprise polymers containing vinylidene chloride, such as Saran. As hereinbefore stated supra, the polymers or copolymers should contain at least 50% vinyl chloride (or equivalent in carbon-chlorine bonds) and preferably at least 70% vinyl chloride. Illustrative but nonlimiting examples of such copolymers are copolymers of vinyl chloride and vinyl acetate, vinyl chloride and propylene, vinyl chloride and vinyl ethers, vinyl chloride and polymers of acrylic or methacrylic acids, vinyl chloride and alkyl esters of maleic acid, vinyl chloride and vinyl acetate, etc. Alternatively, the copolymers may contain substantially more carbon-chlorine bonds than a homopolymer of polyvinyl chloride. An illustrative but nonlimiting example of the latter is Saran, which is a copolymer of vinyl chloride and vinylidene chloride, and which may contain up to as much as 50% vinylidene chloride. These polymers or copolymers may be produced by any of the well known methods such as emulsion polymerization, suspension polymerization, bulk and solution polymerization.

However, it is an essential feature of this invention that a polymer or copolymer produced by any of these processes must not receive additional thermal, chemical or solvent treatment after the polymerization reaction other than the normal washing, drying, clarification, crushing, bagging, etc. operations necessary to produce a usable, porous, dry, granular polymeric product. It has been found that any additional thermal, solvent and/or chemical processing of these polymeric materials such as extruding, pelletizing, casting, plasticizing, etc. greatly reduces their inherent porosity and hence their effectiveness as a filtration medium for removing the olefinic, emulsified oil from the oily water streams of this invention. It has also been found that an essential feature of this invention lies in the ability of the polymeric compounds to be plasticized by, or at least be capable of being plasticized by, the relatively olefinic, polymerizable oily species present in the oil-in-water emulsion. That is to say, the mechanism of the instant invention is believed to be a physio-chemical process wherein the oily species in the emulsion is adsorbed by, and then absorbed into, the polymeric filtration medium.

As heretofore described supra, the filter bed may comprise either particles of a single polymeric material or a mixture of different vinyl chloride or vinylidene chloride containing polymeric compounds. Almost any particle size or particle size distribution of the polymeric material will work, but it has been found that for practical purposes such as efficiency and absorptive capacity expressed as volume of oil absorbed per volume of bed per volume of oily water passed through per unit of time, pressure drop, etc., a preferred particle size distribution comprises coarse particles ranging from about 100 to about 8,000 microns in diameter, more preferably from about 250 to about 7,000 microns in diameter, and most preferably from about 400 to 5,000 microns in diameter. Most commercially available polyvinyl chloride polymers and copolymers are of a finer particle size ranging from about 75 to about 250 microns in diameter. However, one commercially available polymer which has been found to work in this invention is Marvinol 2001, a PVC homopolymer with a controlled particle size distribution in the 250 to 4,000 micron range, available from Uniroyal Chemical.

DESCRIPTION OF THE PREFERRED EMBODIMENTS

This invention will be more apparent from preferred embodiments, which are illustrated by the following examples.

EXAMPLE 1

In this experiment, the oily water was a sour water overhead from a steam cracker primary fractionator tower containing an average of 1,250 vppm (volume parts per million) of highly olefinic, emulsified and free oil. The temperature of the feed was approximately 75° F and it was passed over 15 cc of absorbent packed in a ½ inch diameter glass tube to a height of approximately 6 inches. The absorbent had a particle size distribution of 4–20 mesh or about 800 to 5,000 microns. The treat rate was 15 v/v/hr (volumes of oily water per volume of filter bed per hour). The results of this experiment are shown in Table 1.

TABLE 1

OIL REMOVAL FROM SOUR WATER
15 cc of absorbent - 4–20 mesh packed in
a 1/2" diameter glass tube to a height
of 6".
Sour water of milky opaque appearance
with average of 1,250 vppm olefinic oil
in physical mixture and in emulsion.
Treating temperature 75° F.
Treat rate 15 v/v/hr.

| Absorbent | Vol. of Sour Water/ Vol. of Absorbent Treated | Oil Content of Treated Water vppm | % Oil Removal Efficiency |
|---|---|---|---|
| Sand | 5 | 1,200 | 4 |
|  | 10 | 1,250 | 0 |
| Polyethylene | 5 | 800 | 36 |
| Shreds | 10 | 800 | 36 |
|  | 20 | 1,000 | 20 |
| Polystyrene | 5 | 700 | 44 |
| Shreds | 10 | 1,000 | 20 |
| Activated | 5 | 300 | 76 |
| Carbon | 10 | 500 | 60 |
|  | 20 | 600 | 52 |
| Unprocessed PVC Resin | 5 | < 10 | > 99 |
|  | 10 | < 10 | > 99 |
|  | 50 | < 10 | > 99 |
|  | 100 | ~ 10 | ~ 99 |

The data in Table 1 clearly show that the PVC resin efficiently and effectively removed virtually all the oil in the sour water feed for a considerably long time. Even after treating 100 volumes of the sour water per volume of resin, the oil content of the treated effluent was less than 10 vppm, thus indicating the superior bed life and effectiveness of PVC resin. The PVC resin used in this experiment was a raw, unprocessed, suspension polymerized resin that had received no further treatment.

EXAMPLE 2

In this experiment, 4.5 cubic foot (90 pounds) of the coarse grain (2–60 mesh), raw, unprocessed suspension polymerized PVC resin similar to that used in Example 1 was packed in a vertically mounted, 14 inch diameter, 6 foot long steel pipe appropriately modified to act as a filter. Spent caustic from steam cracked liquid and vapor treating towers, containing 300–800 vppm of a highly reactive, olefinic, polymerizable oil in tight emulsion, was fed through the filter, the results of the experiment being listed in Table 2. Elemental analysis of the oil gave the following (typical) results:

| Element | Wt.% |
|---|---|
| C | 70.5 |
| H | 9.2 |
| S | 19.5 |
| N | <0.1 |
| O | balance |

Nuclear magnetic resonance and infra red spectra of the oil indicated the presence of olefinic, C—S—C, —CH$_2$—CH$_2$— and thiophenic ring functions.

As the data in Table 2 indicate, the PVC filtration medium reduced the oil content of the feed by over 91% (from an average of 625 to an average of 55 ppm), for a period of 15 days at a treat rate of ~5.5 v/v/hr. The amount of oil or oily polymer absorbed by the resin by the end of the run was found to be approximately 1 pound per pound of resin charged. This experiment again demonstrates the highly unusual and unique effectiveness of unprocessed vinyl chloride containing polymers as absorption-filtration media for removing oil present in oily water as an oil-in-water emulsion, and particularly wherein the oil is present as a highly reactive, olefinic, polymerizable species.

TABLE 2

OIL REMOVAL FROM REFINERY SPENT CAUSTIC
Filter dimensions 14" I.D. × 6' high.
Effective height for PVC bed 3'–6".
PVC Resin used
- bottom 3" layer bed support at  2–20 mesh  5 lb
- main filter bed  20–60 mesh  85 lb
Total  90 lb
Spent caustic flow rate varied from 1–5 gpm for an average flow rate of 3 gpm. This represents an average space velocity of 5.5 v/v/hr.

| No. Days Start | Average Inlet Press. psig | Pressure Drop Across Bed, psig | Average Oil Content of Caustic, vppm Feed | Filtrate | % Oil Removal |
|---|---|---|---|---|---|
| 1 | 7 | 0 | 800 | 80 | 90 |
| 2 | 8 | 0 | 600 | 60 | 90 |
| 3 | 9 | 0 | 500 | 75 | 85 |
| 4 | 8 | 0 | 300 | 50 | 83 |
| 5 | 8 | 0 | — | 30 | — |
| 6 | 40 | 5 | 550 | 40 | 92 |
| 7 | 42 | 11 | 500 | 70 | 86 |
| 8 | 44 | 18 | 700 | 50 | 93 |
| 9 | 46 | | 650 | 40 | 94 |
| 10 | 35 | 19 | 650 | 60 | 91 |
| 12 | 48 | 40 | 450 | 55 | 88 |
| 13 | 49 | 41 | 600 | 35 | 94 |
| 14 | 48 | 39 | 800 | 50 | 94 |
| 15 | 48 | 40 | 400 | 70 | 83 |
| Average | | | 625 | ~55 | 92 |

The exact mechanism by which the vinyl chloride containing polymer works in the application of this invention is not known. It is believed that the oil separating ability is due to the porosity of the resin particles along with the plasticizing ability of the reactive, olefinic, emulsifiable oil in the oil-in-water emulsion. Perhaps the oil is initially attracted to the surface of the particles by the hydrophobic nature of the polymer, after which the more olefinic, polar portion of the oil slowly dissolves in and plasticizes the PVC matrix much like a conventional plasticizer does. Analysis of the spent PVC resin used in the above examples showed that its glass transition temperature had dropped as much as 80° F after it had absorbed the oil, thereby supporting the plasticization theory and the fact that the oil is actually absorbed in the polymer matrix as opposed to merely a surface phenomena.

What is claimed is:

1. A process for removing emulsified and free oil from oil-containing aqueous streams, comprising passing said streams over a bed of at least one unprocessed, granular polymeric compound, which compound contains at least 50 mole % of vinyl chloride or its equivalent in carbon-chlorine bonds, thereby removing the oil from the aqueous stream.

2. The process of claim 1 wherein the emulsified oil comprises a highly reactive, olefinic, polymerizable hydrocarbon species.

3. The process of claim 2 wherein the particle size distribution of the polymeric compound ranges from about 100 to about 8,000 microns.

4. The process of claim 3 wherein the polymeric compound comprises at least one resin selected from the group consisting of polyvinyl chloride, polyvinyl chloride-polyvinylidene chloride copolymers, polyvinyl chloride-polyvinyl acetate copolymers, polyvinyl chloride-polyethylene copolymers and mixtures thereof.

5. The process of claim 3 wherein the polymeric compound is selected from the group consisting of homopolymers of vinyl chloride, homopolymers of vinylidene chloride and copolymers of vinyl chloride and vinylidene chloride and mixtures thereof.

6. The process of claim 4 wherein the oil-containing stream comprises sour water overheads from steam cracking operations.

7. The process of claim 4 wherein the oil-containing stream comprises spent caustic from steam cracking liquid and vapor treating towers.

8. The process of claim 4 wherein the particle size distribution of the polymeric compound ranges from about 400 to about 5,000 microns in diameter.

9. A process for removing emulsified oil from oil-contaminated aqueous refinery streams wherein the oil is a reactive, olefinic, polymerizable hydrocarbon, which comprises passing said streams over a bed containing at least one unprocessed, granular, polyvinyl chloride homopolymer having a particle size ranging from 100 to 8,000 microns in diameter, thereby removing the oil from the aqueous streams.

* * * * *